United States Patent
Braband

(10) Patent No.: US 10,229,036 B2
(45) Date of Patent: Mar. 12, 2019

(54) SOFTWARE UPDATE OF NON-CRITICAL COMPONENTS IN DUAL SAFETY-CRITICAL DISTRIBUTED SYSTEMS

(71) Applicant: SIEMENS MOBILITY GMBH, Munich (DE)

(72) Inventor: Jens Braband, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/023,459

(22) PCT Filed: Sep. 4, 2014

(86) PCT No.: PCT/EP2014/068843
§ 371 (c)(1),
(2) Date: Mar. 21, 2016

(87) PCT Pub. No.: WO2015/039878
PCT Pub. Date: Mar. 26, 2015

(65) Prior Publication Data
US 2016/0232076 A1 Aug. 11, 2016

(30) Foreign Application Priority Data
Sep. 19, 2013 (DE) .......... 10 2013 218 814

(51) Int. Cl.
*G06F 9/44* (2018.01)
*G06F 9/45* (2006.01)
(Continued)

(52) U.S. Cl.
CPC ........ *G06F 11/368* (2013.01); *B61L 15/0063* (2013.01); *B61L 27/00* (2013.01);
(Continued)

(58) Field of Classification Search
CPC .......... G06F 11/368; G06F 8/65; G06F 11/07; G06F 11/16; G06F 11/1641; G06F 21/57;
(Continued)

(56) References Cited

U.S. PATENT DOCUMENTS 7,117,119 B2 * 10/2006 Van Dyk .......... G05B 9/02
702/181
7,209,811 B1   4/2007 Goericke et al.
(Continued)

FOREIGN PATENT DOCUMENTS

CN        1558848 A     12/2004
CN        1842763 A     10/2006
(Continued)

OTHER PUBLICATIONS

B. Umamaheswararao, Study of Methods for Analyzing and Building Software on Safety Critical Systems, International Journal of Engineering Research & Technology (IJERT) ISSN: 2278-0181 vol. 1 Issue 8, Oct. 2012, pp. 1-10.*
(Continued)

*Primary Examiner* — Mongbao Nguyen
(74) *Attorney, Agent, or Firm* — Laurence Greenberg; Werner Stemer; Ralph Locher

(57) ABSTRACT

A method operates a safety-critical system, which system contains at least one first data device having approved, safety-relevant software and at least one reference data device having the same approved, safety-relevant software. In the method, after a type check of the system, the at least one first data device is equipped with at least one piece of non-safety-relevant additional software and the at least one reference data device is blocked from software modifications. Before safety-related data information is output, output information of the at least one first data device and of the at least one reference data device are checked for a match
(Continued)

with regard to the safety-relevant software by a comparison device, and the safety-related data information is output in the case of a match.

6 Claims, 1 Drawing Sheet

(51) Int. Cl.
G06F 11/36 (2006.01)
B61L 27/00 (2006.01)
G06F 11/07 (2006.01)
G06F 11/16 (2006.01)
G06F 21/57 (2013.01)
G06F 21/74 (2013.01)
H04L 1/22 (2006.01)
B61L 15/00 (2006.01)
G06F 8/65 (2018.01)
H04L 29/06 (2006.01)

(52) U.S. Cl.
CPC ....... *B61L 27/0055* (2013.01); *B61L 27/0061* (2013.01); *G06F 8/65* (2013.01); *G06F 11/07* (2013.01); *G06F 11/16* (2013.01); *G06F 11/1641* (2013.01); *G06F 21/57* (2013.01); *G06F 21/74* (2013.01); *H04L 1/22* (2013.01); *H04L 63/12* (2013.01)

(58) Field of Classification Search
CPC ...... G06F 21/74; B61L 15/0063; B61L 27/00; B61L 27/0055; B61L 27/0061; B06L 27/00
See application file for complete search history.

(56) References Cited

U.S. PATENT DOCUMENTS

| | | | | |
|---|---|---|---|---|
| 7,818,103 B2* | 10/2010 | Johansen | ............. | G05D 1/0206 701/22 |
| 8,341,738 B2* | 12/2012 | Fazunenko | ......... | G06F 11/3664 726/22 |
| 8,666,835 B2* | 3/2014 | Minnis | ............. | G06F 17/30867 705/26.1 |
| 8,693,610 B2* | 4/2014 | Hess | ........ | G21C 9/00 376/277 |
| 8,910,131 B2 | 12/2014 | Moosmann et al. | | |
| 9,164,860 B2* | 10/2015 | Manz | ................. | G09G 3/006 |
| 9,460,077 B1* | 10/2016 | Casey | ................. | G06F 17/2725 |
| 2004/0153269 A1* | 8/2004 | Kalas, Jr. | .......... | G05B 23/0243 702/81 |
| 2007/0277023 A1 | 11/2007 | Weiberle et al. | | |
| 2008/0010638 A1* | 1/2008 | Klopfer | ................. | G05B 9/02 717/168 |
| 2008/0140962 A1* | 6/2008 | Pattabiraman | ........ | G06F 11/167 711/162 |
| 2009/0300179 A1* | 12/2009 | Srinivasan | ............. | H04L 63/10 709/225 |
| 2010/0313075 A1* | 12/2010 | Liakos | ............... | G06F 11/3608 714/38.1 |
| 2011/0078790 A1* | 3/2011 | Fazunenko | ............. | G06F 9/468 726/22 |
| 2011/0125302 A1* | 5/2011 | Sethuraman | ............. | G05B 9/02 700/97 |
| 2011/0126188 A1* | 5/2011 | Bernstein | ............. | G06F 11/0751 717/174 |
| 2012/0054729 A1* | 3/2012 | Sobel | .......... | G06F 8/65 717/169 |
| 2012/0096428 A1 | 4/2012 | Moosmann et al. | | |
| 2012/0174087 A1* | 7/2012 | Bentzien | .................. | G06F 8/65 717/169 |
| 2012/0221191 A1* | 8/2012 | Bell | .......... | F28G 1/08 701/29.1 |
| 2012/0304024 A1* | 11/2012 | Rohleder | ................. | G06F 9/28 714/49 |
| 2013/0024721 A1* | 1/2013 | Kabulepa | ........... | G06F 11/1641 714/5.1 |
| 2013/0145429 A1* | 6/2013 | Mendel | ................. | G06F 21/00 726/4 |
| 2013/0185564 A1* | 7/2013 | Jaber | .................... | G06F 21/572 713/176 |
| 2013/0268798 A1* | 10/2013 | Schade | ............... | G06F 11/1487 714/3 |
| 2013/0332926 A1* | 12/2013 | Jakoljevic | ........... | G06F 9/45533 718/1 |
| 2014/0129001 A1* | 5/2014 | Staudenmaier | ........ | G08B 21/06 700/79 |
| 2014/0365102 A1* | 12/2014 | Fries | .................... | G08G 1/164 701/117 |

FOREIGN PATENT DOCUMENTS

| | | |
|---|---|---|
| CN | 101176070 A | 5/2008 |
| CN | 102460397 A | 5/2012 |
| CN | 103262045 A | 8/2013 |
| DE | 3938501 A1 | 5/1991 |
| DE | 10332700 A1 | 1/2005 |
| DE | 102005023296 A1 | 11/2006 |
| DE | 102009019089 A1 | 11/2010 |
| DE | 102011086530 A1 | 5/2012 |
| EP | 0428934 A2 | 5/1991 |
| WO | 03047937 A1 | 6/2003 |
| WO | 2006120165 A1 | 11/2006 |

OTHER PUBLICATIONS

Mustafa S. Durmus, Safety-Critical Interlocking Software Development Process for Fixed-Block Signalization Systems, 2012, pp. 165-168. https://www.sciencedirect.com/science/article/pii/S1474667015347649 (Year: 2012).*

Bruce Douglass, Agile analysis practices for safety-critical software development, 2013, pp. 1-14. https://www.ibm.com/developerworks/rational/library/agile-analysis-practices-safety-critical-development/agile-analysis-practices-safety-critical-development-pdf.pdf (Year: 2013).*

Leanna K. Rierson, A Systematic Process for Changing Safety-critical software, 2004, pp. 1-7. https://ieeexplore.ieee.org/stamp/stamp.jsp?tp=arnumber=886878 (Year: 2004).*

M. Ben Swarup, A Software Safety Model for Safety Critical Applications, 2009, pp. 1-12. https://pds.semanticsholar.org/3845/661e15c6d469f833bb8cc5eb9fad97feafb2.pdf (Year: 2009).*

A. Drozd, Checkability of the Digital Components in Safety-Critical Systems: Problems and Solutions, 2011, pp. 1-6. https://ieeexplore.ieee.org/stamp/stamp.jsp?arnumber=6116606 (Year: 2011).*

* cited by examiner

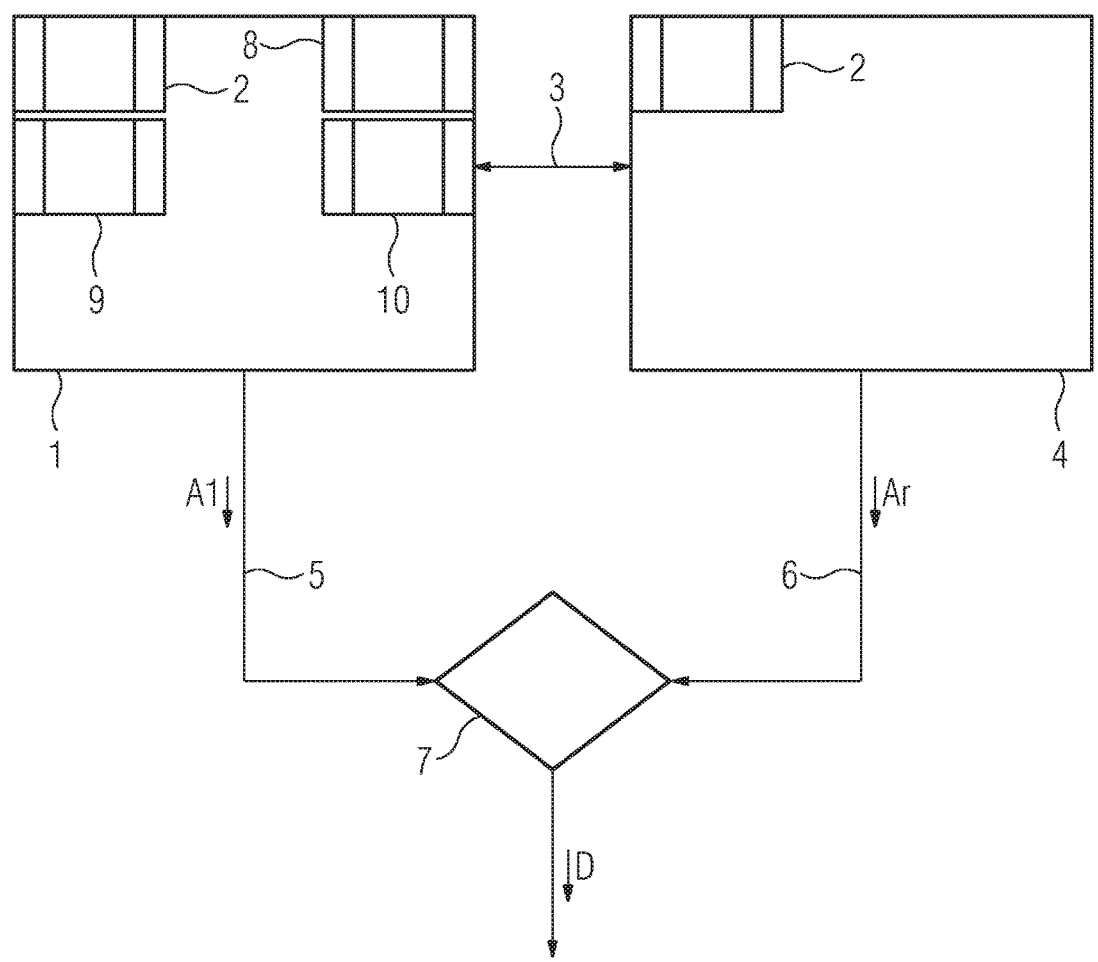

SOFTWARE UPDATE OF NON-CRITICAL COMPONENTS IN DUAL SAFETY-CRITICAL DISTRIBUTED SYSTEMS

BACKGROUND OF THE INVENTION

Field of the Invention

It has proved very difficult or practically impossible to operate data devices such as personal computers, for instance, in such a way that they can be operated without identifiable vulnerabilities. This causes particular problems when data devices are part of a safety-critical system which is provided with safety-related and non safety-related software and which, before being used, must be type-tested and, for example for a train protection system or for an operating device in an interlocking system, must be approved in a laborious procedure. Afterwards, it is no longer permitted to modify the software. According to the prior art, this is even monitored automatically and such systems switch themselves off automatically after changes are identified. If after the testing and approval of such a system the need arises to introduce non safety-related software into such a system by means of an update or patches, then either recourse must be made to approved, uniquely identifiable software or approval testing must be carried out again.

BRIEF SUMMARY OF THE INVENTION

The object of the invention is to define a method for operating a safety-critical system, which method can be used to update the system with relatively little effort.

This object is suitably achieved according to the invention by a method for operating a safety-critical system comprising at least one first data device containing approved, safety-related software and comprising at least one reference data device containing the same approved, safety-related software, in which method after the system has been type-tested, the at least one first data device is provided with at least one piece of non safety-related add-on software, and the at least one reference data device is blocked to software modifications; before an item of safety data information is output, a comparator is used to check the output information from the at least one first data device and from the at least one reference data device for a match with regard to the safety-related software, and the safety data information is output only if there is a match.

An essential advantage of the method according to the invention is that it provides the facility in the safety-critical system to update or to add non safety-related software subsequently, i.e. after approval, without the need afterwards to carry out type-testing again together with re-approval.

To guarantee safety, in a system comprising a plurality of first data devices and a plurality of reference data devices it is particularly advantageous to output safety data information only once a check of the output information from the first data devices and from the reference data devices with regard to the safety-related software has given the result that there is a match for each of a qualified majority of the first data devices and of the reference data devices.

The method according to the invention provides the advantageous facility to use data-protection software as the add-on software, which may be virus-protection software in particular or malware-protection software in general.

In addition, the method according to the invention advantageously allows external software to be used as the add-on software, where external software shall be understood to include, for example, commercial software, software not developed personally by the designer of the safety-critical system, or untested software.

Thus the method according to the invention is not subject to any restrictions on the type of the non safety-related software.

In a particularly advantageous embodiment of the method according to the invention, prior to type-testing, the at least one first data device is provided with at least one non safety-related add-on software in the manner that program and data are separate from each other, wherein test data containing a code is used as the data; after type-testing, the at least one first data device is provided in the same program with up-to-date data using the code after checking the validity of the up-to-date data. The code may be a signature. This embodiment of the method according to the invention is characterized in that faults in the safety-critical system by updating the add-on software are avoided with a high degree of certainty.

This embodiment of the method according to the invention can also be used independently of a safety-critical system comprising at least one first data device containing approved, safety-related software and comprising at least one reference data device containing the same approved, safety-related software, i.e. can also be used in a safety-critical system comprising one data device in the sense of the first data device mentioned above or comprising a plurality of data devices.

For fault-free updating of the add-on software, it is also advantageous if, when data-protection software is the add-on software, it is ensured that the functionality of the program cannot be affected by the data.

In the same context, it is advantageous when the add-on software is used, to check the validity of the code of the data of this add-on software by means of the safety-related software.

The safety-critical system can refer to systems of very different types, including train protection systems or operating systems for interlocking systems. It appears particularly advantageous if a train protection system is used as the safety-critical system, an operating computer is used as the at least one first data device, and an interlocking system is used as the comparator.

BRIEF DESCRIPTION OF THE DRAWING

To provide further details of the invention, the FIGURE shows schematically an arrangement comprising a first data device and a reference data device.

DESCRIPTION OF THE INVENTION

The FIGURE shows a first data device 1, which may be an operating computer of a train protection system. The first data device 1 contains approved, safety-related software 2. Connected to the one first data device 1 via a data connection 3 is a reference data device 4, which is likewise provided with the approved, safety-related software 2.

The one first data device 1 is connected via a data channel 5, and the reference data device 4 via a further data channel 6, to a comparator 7, the function of which in a train protection system is performed by an interlocking system (not shown) or another safety-oriented comparator.

For the purpose of describing further the method according to the invention, it is assumed that the arrangement just described has been subject to type-testing and approval in this condition. If subsequently this arrangement is provided, for example, with an add-on software 8 in the form of a virus-protection program, then the reference data device 4 is simultaneously blocked to software modifications; it is still equipped solely with the safety-related software 2.

If an item of safety data information D is meant to be output by the comparator 7, then prior to this, said comparator 7 acquires output information Al and Ar from a first data device and from the reference data device 4; said output information Al and Ar is checked with regard to the safety-related software 2, and the safety data information D is output if the safety-related software 2 matches.

Apart from the non-related add-on software 8, the one first data device can also be provided with further non safety-related add-on software 9, which in the case of a train protection system may be, for example, any software for video surveillance of a station facility, or with an additional add-on software 10, which may constitute software for a railroad-crossing monitoring system.

In this case, the first data device 1 can be provided with the various pieces of add-on software 8, 9 and 10 in the manner (not shown) that for each piece of software the program and the associated data are separate. Prior to type-testing and/or approval, each of the programs are stored with test data and a code in the one first data device 1. Obviously the same applies correspondingly to the safety-related software 2 as regards the one first data device 1 and the reference data device 4.

If after type-testing the one first data device is meant to be updated in terms of the add-on software 8, for instance, then the one first data device 1 is provided with up-to-date data for this software. In this process, the code is used in a way that is independent of the transfer of the up-to-date data and is checked for a match. The validity of the up-to-date data is also checked. It is ensured here that the data in the add-on software cannot modify the functionality of the program in the add-on software.

The add-on software can also be updated in this process provided it is ensured that the update cannot remove the safety mechanisms described above, especially if an effect on the reference device 4 via the data connection 3 can be ruled out.

The invention claimed is:

1. A method for operating a safety-critical system executed by a hardware processor, the method comprises the steps of:
   providing a safety-critical system including at least one first data device having approved, safety-related software and at least one reference data device also having the approved, safety-related software, wherein the approved, safety-related software of the at least one first data device is identical to the approved, safety-related software of the at least one reference data device;
   type-testing and approving the safety-critical system;
   providing the at least one first data device with at least one piece of non-safety-related add-on software;
   after performing the type-testing and approving step, blocking the at least one reference data device from any software modifications;
   performing, via a comparator, a comparison check on output information from the at least one first data device and from the at least one reference data device for matching with regard to at least one piece of safety-related software, before an item of safety data information is output; and
   outputting the safety data information if there is a match and without performing an additional type-testing of the safety-critical system;
   wherein prior to performing the type-testing providing the at least one piece of non-safety-related add-on software to the at least one first data device in a manner that program and data are separate from each other, wherein test data containing code is used as the data, and after performing the type-testing, providing the at least one first data device with a same program with up-to-date data using the code after checking a validity of the up-to-date data; and
   wherein the at least one piece of non-safety-related add-on software is data-protection software, and it is ensured that a functionality of the program cannot be affected by the data.

2. The method according to claim 1, which further comprises:
   providing a plurality of first data devices and a plurality of reference data devices; and
   outputting the safety data information if the comparison check of the output information from the first data devices and from the reference data devices with regard to the at least one piece of safety-related software has given a result that there is a match for each of a qualified majority of the first data devices and of the reference data devices.

3. The method according to claim 1, which further comprises providing external software as the at least one piece of non-safety-related add-on software.

4. The method according to claim 1, wherein when the at least one piece of non-safety-related add-on software is used, checking a validity of the code of the data of the at least one piece of non-safety-related add-on software by the approved and safety-related software.

5. The method according to claim 1, wherein in order to update the at least one piece of non-safety-related add-on software, providing the at least one first data device with the up-to-date data for the at least one piece of non-safety-related add-on software using the code in a way that is independent of a transfer of the up-to-date data.

6. The method according to claim 1, which further comprises:
   providing a train protection system as the safety-critical system;
   providing an operating computer as the at least one first data device; and
   providing an interlocking system as the comparator.

* * * * *